Dec. 8, 1959   B. CRETIN-MAITENAZ   2,915,856
MACHINE FOR GRINDING AN OPTICAL SURFACE IN
A PIECE OF REFRACTIVE MATERIAL
Filed March 4, 1959   8 Sheets-Sheet 5

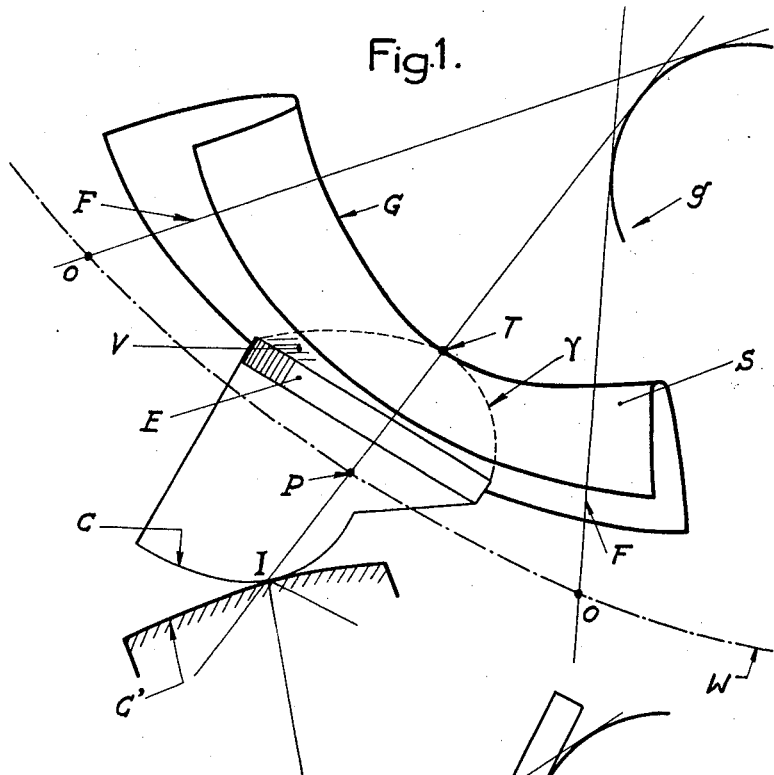
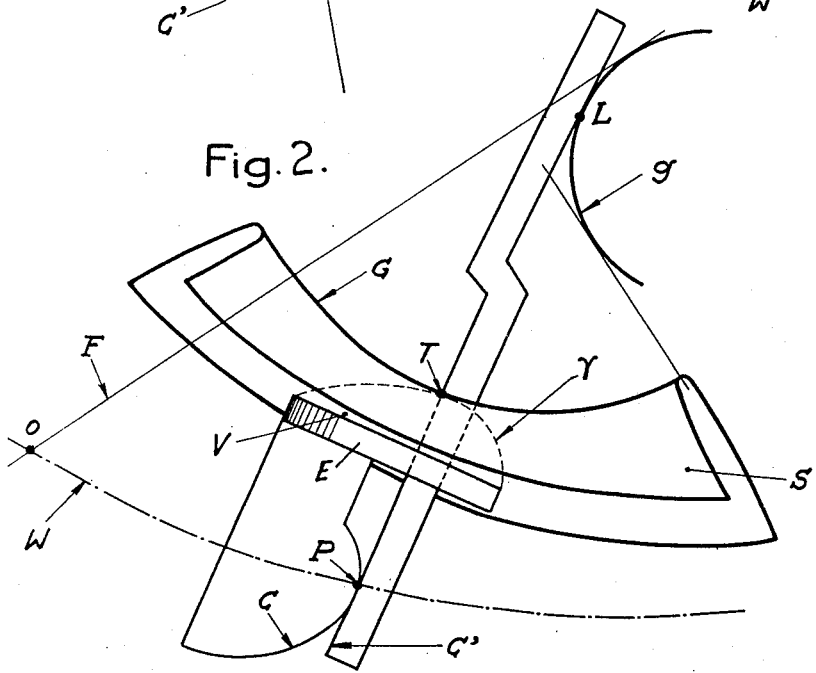

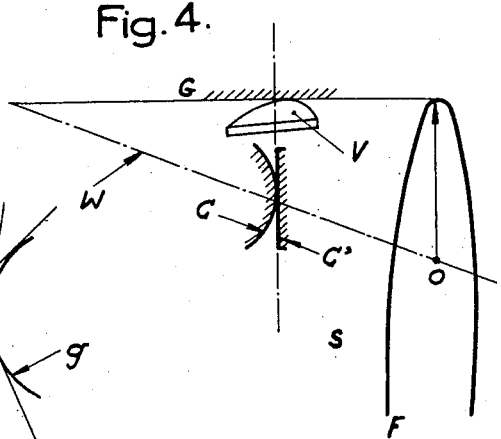
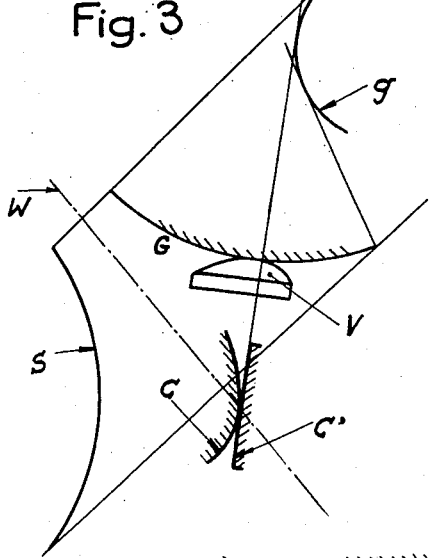
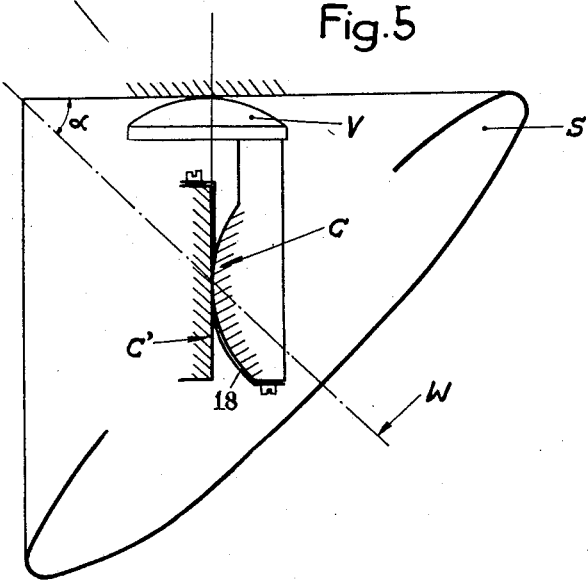

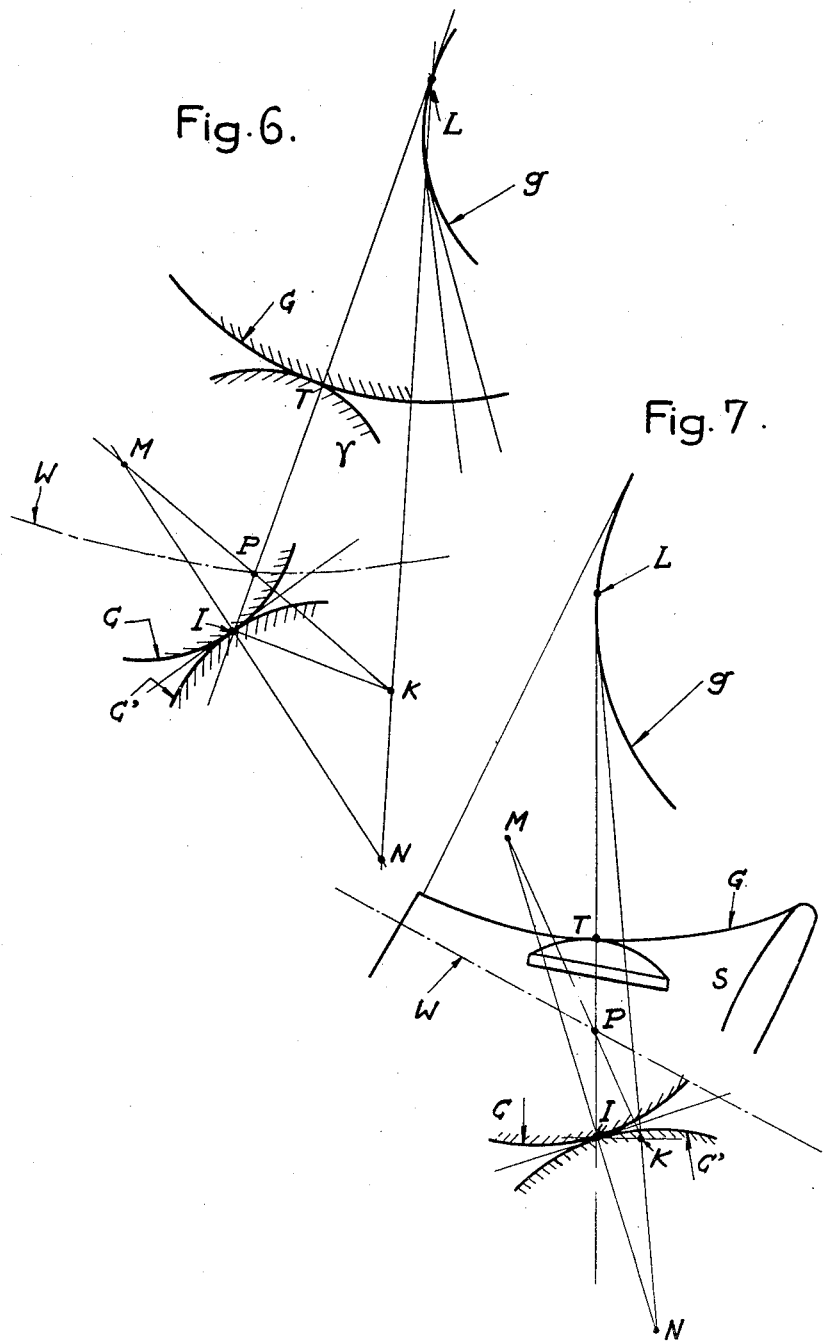

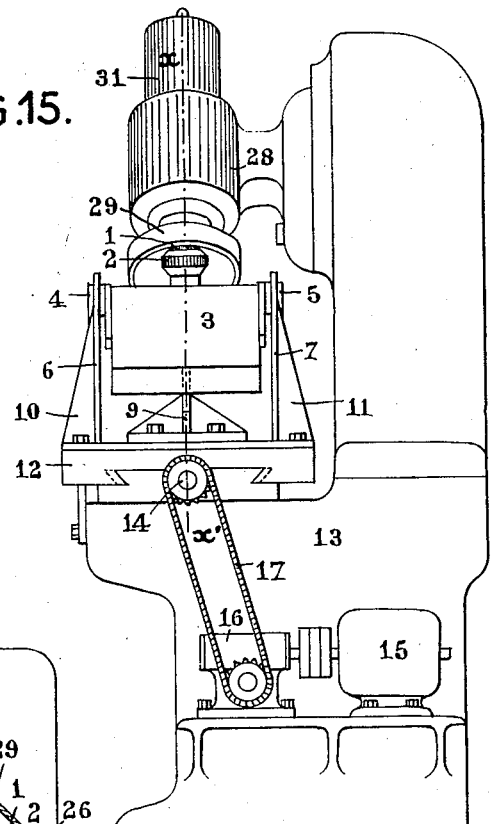
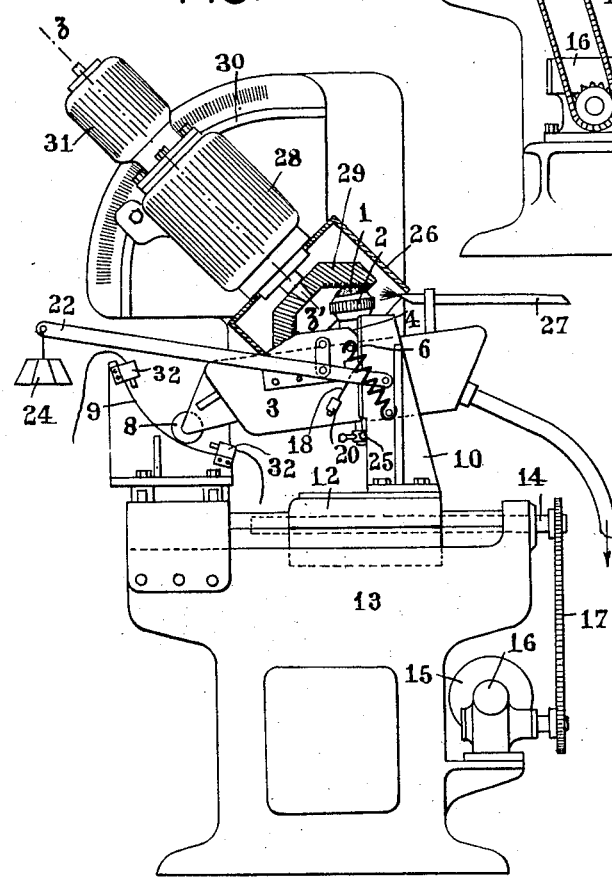

United States Patent Office 2,915,856
Patented Dec. 8, 1959

2,915,856

MACHINE FOR GRINDING AN OPTICAL SURFACE IN A PIECE OF REFRACTIVE MATERIAL

Bernard Cretin-Maitenaz, Joinville-le-Pont, France, assignor to Societe Industrielle et Commerciale des Ouvriers Lunetiers (Cottet, Poichet, Tagnon & Cie), Paris, France Application March 4, 1959, Serial No. 797,121

Claims priority, application France March 9, 1955

5 Claims. (Cl. 51—124)

This application is a continuation-in part of Serial No. 570,387, filed March 8, 1956, now abandoned.

The applicant has already described in his prior patent application Ser. No. 470,755 filed on November 23, 1955, which issued as Patent No. 2,869,422, a progressive focal power optical system wherein a refractive surface has a directrix curve or main line extending thereacross and such that at each point of this directirx curve the main radii of curvature and therefore the radii of curvature of all the sections normal to said directrix curve have the same value varying according to the position of this point on said directrix curve and increasing therealong from one edge of the refractive body to the opposite edge. As a consequence of this surface structure, at the points thereof which lie on either side of the said directrix curve and within the physical limits of the refractive body, the radii of curvature of all the normal sections, which lie between the two maximum and minimum values of the necessarily adjoining two main radii of curvature, are substantially equivalent. Thus, any small area or fraction of the refractive surface which surrounds one of its points will form a substantially astigmatic image. Along each of a series of transverse lines of this surface for which, for example, the sum of the two main curvatures and therefore of the curvatures in any normal section and in the orthogonal normal section is constant, the focal power is constant and equal to that measured at the point where this transverse line intersects the aforesaid directrix curve. Thus, throughout the refractive surface and within the body contour the focal power will be graduated along said transverse line from one to the other of the two edges of this contour which limit said directrix line and according to the law of progressiveness which has been chosen for this directrix curve.

Now it is the essential object of this invention to provide a form of generation of a surface of the type broadly set forth hereinabove and a machine for cutting or grinding this surface in a refractive body or piece of refractive material in accordance with this form of generation.

This form of generation is obtained from a generating surface of which the sections normal to a directrix curve of this generating surface are characterized, along this curve, by radii of curvature having the stepped or progressively varying values which it is desired to give to the radius of curvature of the refractive surface the body to be shaped being ragidly fixed on a mounting to which a specific movement is imparted in relation to the generating surface, this movement being such that the progressive surface is determined by the envelope, in said mounting, of the successive positions of the generating surface in relation to said mounting, and the directrix curve of said progressive surface by the envelope of the successive positions of the directrix curve of the generating surface in relation to said mounting, this movement of the mounting being subordinate to the condition that each element of said main curve of the refractive surface which is being formed by contact at one point with the main line of the generating surface has a radius of curvature equal to the radius of curvature of the section of the generating surface at the same point in a plane normal to the main line of said generating surface.

The features and advantages of this invention will appear more clearly from the following description of a few forms of embodiment of this invention which are given by way of example only and shown in the attached drawings forming part of this specification. In the drawings:

Figure 1 is a part-sectional view showing the method of generating the progressive surface according to this invention;

Figure 2 is a similar view showing the progressive surface generating method of Fig. 1 in the specific case of a mounting movable with respect to the generating surface;

Figure 3 shows in the same way another example of surface generation according to Fig. 2, wherein the generating surface is a surface of revolution;

Figure 4 is a similar view showing another specific example of generation according to Fig. 2, wherein the generating surface is a cone;

Figure 5 shows the same case as in Fig. 3, except that the cone is of revolution;

Figure 6 shows a known construction, according to the so-called Savary process used in other forms of generation;

Figure 7 shows in the same way as in Fig. 1 a method of generating the progressive refractive surface by displacing the mounting in relation to the generating surface, this method differing somewhat from that shown in Fig. 2;

Figures 15 to 17 illustrate an end view, a side view and an enlarged portion of this side view, respectively, showing a cutting machine operating according to the specific form of generation illustrated in Fig. 5.

Figure 8:
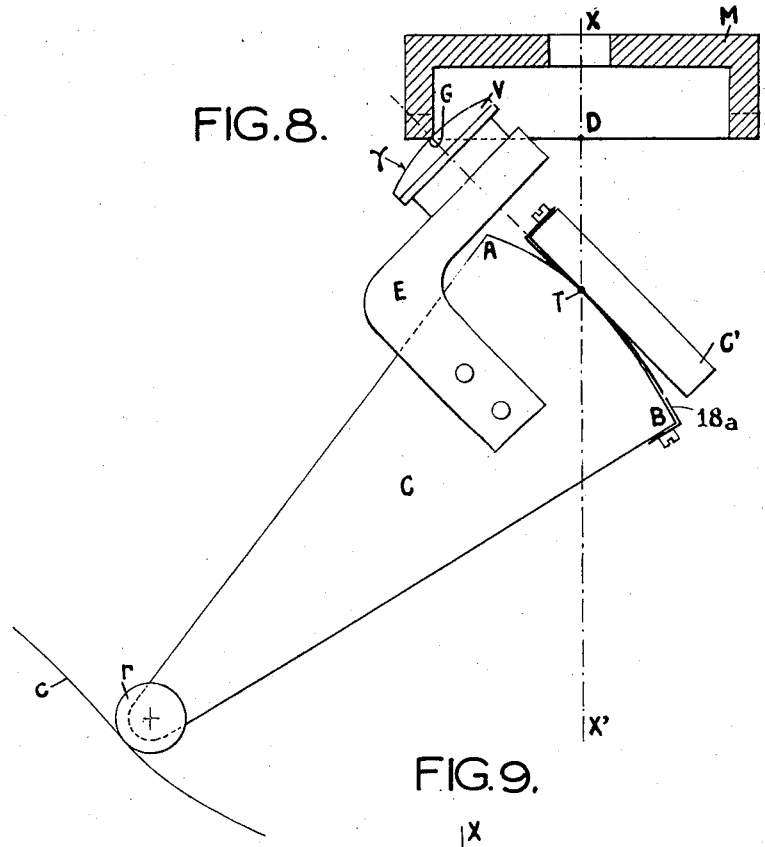
Figure 8 illustrates in the same way a surface generating method according to Fig. 3, wherein the generating surface of revolution about an axis is reduced to a circle.

Referring first to Fig. 1, the body of refracting material in which the surface V is to be generated is rigidly secured on a mounting E which carries also a cam C rolling without sliding on another movable or fixed cam C'. This surface V is shaped by, and constantly tangent to, a fixed generating surface S. In this figure it is clear that the plane of symmetry of the surface S is coincident with the plane of the figure which intersects the surface S along its main line or directrix curve G having an evolute g. The sections of the generating surface S through planes normal to its directrix curve G at points T are curves F of which the centres of curvature at these points T are identified herein as points O spaced along a curve of development W inscribed in the plane of the figure. In each of its different positions the mounting E defines an elementary line of the surface V through the intersection of the relative position of the surface S in this mounting with the immediately adjacent relative position of this surface S. It should be noted that at point T this curve has obviously the same structure as the section of the generating surface S through the osculating plane at the point P of this curve. Now, according to the so-called theorem of Meunier, the curvature of the section of a surface at a point by a plane passing through a tangent to the surface at this point will determine completely the curvatures, at this point, of the sections by all the planes passing through this same tangent. Therefore, the sections of both surfaces S and V through the plane passing by the straight line projected at T on the plane of the figure have equal curvatures and more particularly these two surfaces at this point have the same main curvature in this transverse direction and therefore, the same centre of curvature, located on the line W.

If V is to be a surface having a focal power characterized by equal main curvatures along its main line or directrix curve γ by which it is cut by the plane of the figure, this can be obtained by simply having at the point of contact of line γ with G the centre of curvature P of this line γ lie on W. The operative contours of cams C and C' are so chosen that the generation, through the rolling of C on C' at contact point I and possibly through the displacement of C', will produce a curve γ of which the centres of curvature at the points of contact with G lie constantly on W. Thus, the equality of the two main radii of curvature of the generated surface V along its main line γ and the continuous variation of these radii according to the law adopted beforehand for the variation of the main transverse radii of curvature of the generating suface S along its main line G are obtained.

Conversely, from the two cams C and C' and a contour G calculated in the strict observance of a certain law of variation in the radius of curvature PT along γ, it is possible to generate a progressive surface V by simply using a surface S passing through G in such a way that its sections normal and orthogonal to the plane of the figure along this line G have their centres of curvature O along G disposed at spaced intervals along the line W described by the centre of curvature P of line γ at T during the movement of the mounting E which results from the movement of cam C.

Within the limits of the form of generation defined hereinabove, a few typical, advantageous and easily reproducible practical forms of embodiment are described hereafter with reference to the diagrammatical Figs. 2 to 7 of the drawings.

In the form of embodiment shown in Fig. 2, the edge of the cam C' materializes the normal in the plane of the figure to the main line G of the generating surface S and this edge is compelled to roll on the evolute g of this curve G, the latter being constantly tangent to the evolute g at a point L. Under these conditions, it is constantly the same point of the edge of the guide-strip that is positioned at T and thus the curve γ is the involute of the edge of cam C. Consequently, when the curve G and therefore its evolute g have been duly determined, it will be sufficient to cut the edge of cam C according to the evolute of the desired curve γ and to calculate its surface S passing through its main line G by transverse radii of curvature equal to TP for each point T.

Fig. 3 shows a particularly simple practical embodiment of the form of generation illustrated in Fig. 2. In this embodiment the generating surface S is of revolution about an axis lying in the plane of the figure and constituting the line W in this case. If the meridian G of this surface of revolution is circular and if the surface becomes toroidal, the evolute g of this meridian G is reduced to a point and the movement of the straight line C' becomes then a simple pivotal movement about this point. When the meridian G is a circle, the generating surface S is a tore and when the radius of this circle becomes zero the generating surface S is reduced to a circle. The essential component elements of a machine for cutting refractive material according to this specific form of generation will be described presently with reference to Fig. 8.

According to another specific embodiment shown in Fig. 4 and based on the form of embodiment of Fig. 2, the generating surface S is a cone. Thus, the directrix curve or main line G of this surface is one generatrix of this cone and W is a straight line passing through the vertex of the cone. The guide strip C' is thus normal to this straight line G and its movement is a movement of translation parallel to this straight line. Figure 5 illustrates a further specific embodiment wherein the surface S is a cone of revolution of which the half-angle α is 45° and the sections F of this surface are parabolas. A cutting machine according to this specific form of generation shown diagrammatically in Fig. 5 will be described presently with reference to Figs. 15 to 17, stress being laid on the nature and mode of operation of the system 18 for enabling the two cams C and C' to roll without slipping on each other. If the half-angle is less than 45° these same sections are ellipses and if it is greater than 45° these sections are hyperbolas.

In another form of generation according to this invention C' is stationary. In this case, and given a selected contour of one of these cams C or C', the contour of the other cam will be constructed by points so that the centre of curvature P of the envelope of the main curve γ will lie on the line W corresponding to the selected generating surface S, by the so-called Savary construction. This conventional construction is shown in Fig. 6, wherein:

If C contacts C' at I, if γ contacts G at T, if IT contacts g at L, if M is the centre of curvature of C at I, and N the centre of curvature of C' at I, the centre of curvature P of γ at T will lie at the intersection of LI and MK, the point K itself lying at the intersection of LN with the perpendicular traced from I to LI. With this construction it is possible for example to find N when F, M, I, T, and L are known.

Figure 7 illustrates this form of generation utilizing a fixed cam C' in the specific case wherein the generating surface S is a surface of revolution having an axis W located in the plane of the figure and having also a meridian G. When the meridian G is reduced to a point the generating surface S is reduced to a circle. When the meridian G is a straight line this generating surface S becomes a cone of revolution.

The surface S as a rule will be materialized by the envelope of the operative or cutting contour or edge of a surfacing tool adapted during the generation to accomplish preferably a simple movement.

Let us consider as a specific example the case in which S is a surface of revolution; the tool may be identified with the surface S and a movement of rotation about its axis may be imparted thereto.

Without departing from the spirit and scope of this invention it is also possible, according to the arrangements contemplated, to have S movable and C stationary, or C' stationary and S, C both movable. In the preceding description it is assumed that S is stationary in order to simplify the disclosure.

In the practice the mode of generation will be applied as customary in optics, i.e. either directly on the piece of glass to be surfaced, or on a tool of cast-iron or other material. This tool is subsequently used as conventional in the technique of preliminary shaping, finishing and/or polishing.

In the case of molded glass lenses, the mold surface will be generated either directly or through the medium of a counterpart which is subsequently used for surfacing the mold impression.

Now two devices for cutting a progressive surface, which are established according to two specific cases defined hereinabove of the form of generation of this invention, will be described hereafter with reference to Figs. 8 and 9 of the drawings.

Figure 8 illustrates the essential component elements of a cutting machine constructed according to the specific form of generation utilizing a movable guide strip having a generating surface reduced to a circle lying in a plane normal to the plane of symmetry and having its centre in this plane. In this device, the mass of material V to be cut according to the desired progressive surface is secured on a mounting E carrying a cam C kept in rolling contact at T with a rectilinear cam C' mounted for pivotal movement about the tangent at a point G of the lower circular edge of a grinding wheel M of the inverted-cup type, as shown, this lower circular edge constituting in this case the generating surface. The contour ATB of cam C is cut according to the evolute of the directrix curve or main line chosen for the surface to be cut. In order to facilitate the manufacture, the device is completed by a roller or follower r carried by the cam C and engaging a fixed cam c in order to reduce the possibility of displacement of the different elements only to those positions in which the point T at which C is tangent to C' lies on the axis of revolution XX' of the grinding wheel, and also by a steel strip 18a disposed in the manner set forth presently with reference to Figs. 15 and 17 with a view to permit the slip-free relative rolling motion of cams C and C' on each other. In the device thus constructed the lower edge of the cup-shaped grinding wheel limits the surface to be cut along a curve of this surface which is a circle of same radius as that of the edge of the cup-shaped grinding wheel. It is a simple matter to check directly whether the radii of curvature of the two main normal sections of the surface generated at the point of edge G are equal or not. In the main section consisting of the plane of the figure, the normal at G of the main curve $\gamma$ of the surface being cut is GT, the centre of curvature being positioned at T as a consequence of the slip-free rolling engagement of cams C and C' with each other. If D is the section of the axis of revolution XX' in the plane of the edge G, the centre of curvature of the section GD orthogonal to the plane of the figure lies obviously at D and the centre of curvature of the main section GT normal to the plane of the figure, according to the socalled theorem of Meunier, lies at the intersection of this straight line GT with the normal at D to GD, that is on the axis XX' and, therefore at point T held by roller r on this axis XX'.

Figure 9:
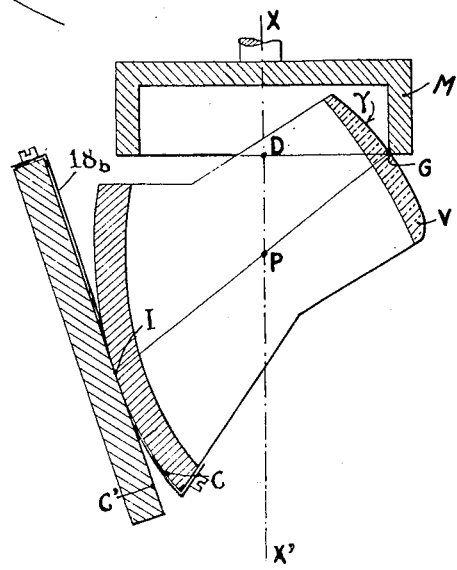
Figure 9 shows in the same fashion the essential component elements of another cutting machine in the specific application of the surface generation method illustrated in Fig. 7, wherein the generating surface of revolution about an axis is also reduced to a circle.

The device illustrated in Fig. 9 is a specific form of embodiment of the fixed-cam generation wherein the generating surface, as in the preceding case, is reduced to a circle disposed in a plane orthogonal to the plane of symmetry and having its centre positioned in this plane. In this device the cam C rolls on a fixed cam C' of which the contact surface may be a plane. This slip-free rolling engagement is obtained as in the preceding case by means of a steel strip 18b having the same function as the strips 18 of the machine to be described presently with reference to Figs. 15 to 17. The contour of cam C is subordinate to or determined by the condition that the centre of curvature P of the main section in the plane of the figure of the curve $\gamma$ at point G remains on the axis XX' during the rolling movement of C on C'. Under these conditions, the two main radii of curvature at this point are equal to GP and therefore equal to each other.

Figure 17:
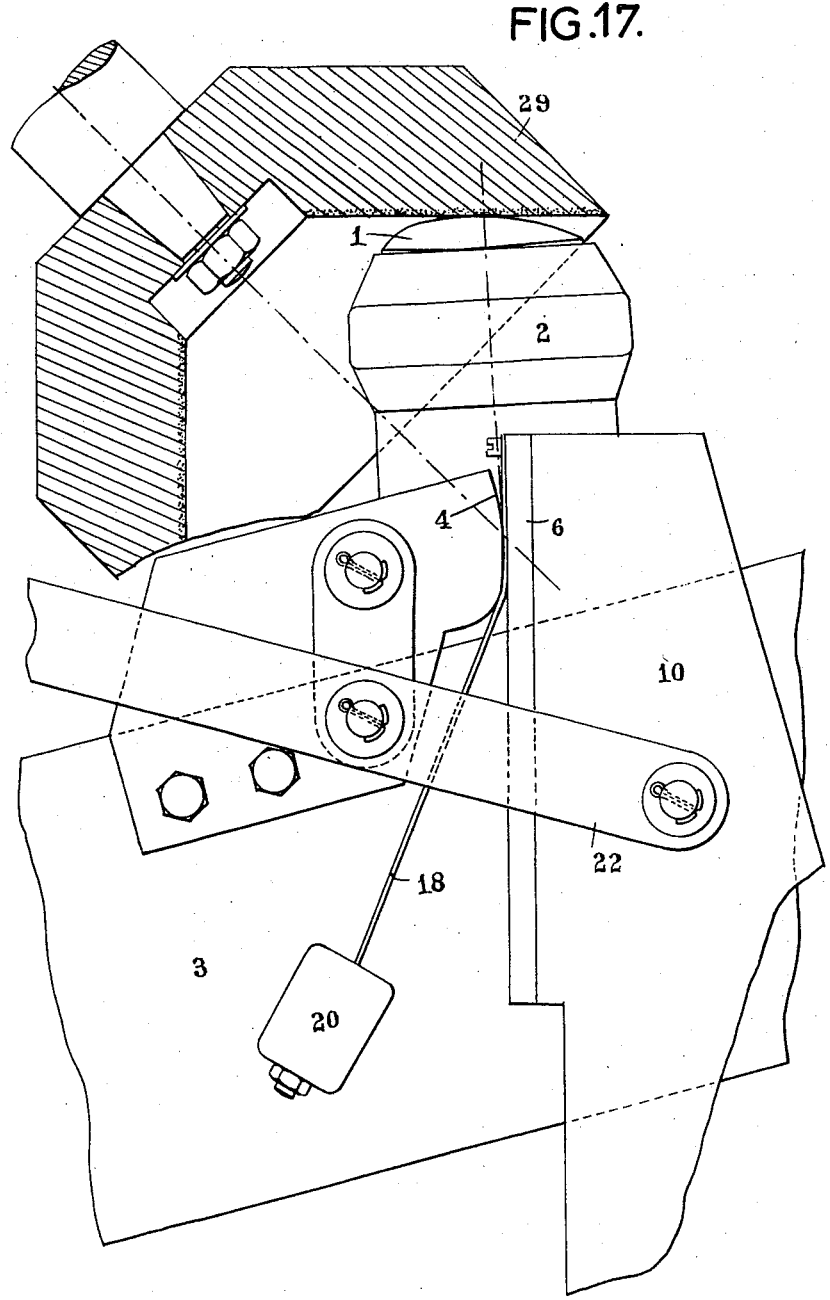

The machine illustrated in Figs. 15 to 17 of the drawings is designated with a view to cut a surface according to the mode of generation shown in Fig. 5. In this machine the refractive glass 1 is rigid with a mounting 2 carried by a cradle 3. This cradle is displaceable in a vertical plane parallel to the plane of Fig. 16 and its movements are controlled by: (1) the slip-free rolling movement of two cams 4 and 5 on vertical guide strips 6 and 7; (2) the rolling movement of a roller or follower 8 on a fixed cam 9.

This movement is controlled by the displacement of a pair of brackets 10, 11 carrying guide strips 6, 7 respectively. The longitudinal displacement on these brackets 10, 11 is obtained by the translation of a carriage 12 sliding on the frame structure 13 of the machine, which results from the rotation of a shaft 14 driven from a motor 15 associated with a reducing gear 16 driving the shaft 14 through the medium of a chain 17.

As a consequence of this movement of translation, for example from the left to the right (Fig. 16), the cradle 3 pivots counter-clockwise and the roller 8 moves down the cam face 9.

The cams 4 and 5 fore and aft of the plane of Fig. 16 in which the glass is secured are fastened on the cradle 3 in such a manner that their projection in the longitudinal plane xx' of Fig. 15 (which is the plane of symmetry of the movement) is coincident with the evolute of the directrix curve of the surface to be cut in the glass. The position of roller 8 on cradle 3, the shape and position of cam 9 rigid with the frame structure 13 of the machine are such that during the rolling of cams 4, 5 on plates 6, 7, and of 8 on 9, the points of contact of 4, 5 on 6, 7 are projected onto the plane of symmetry xx' at a point situated on the axis zz' of revolution of the grinding wheel 29.

In order to ensure a slip-free rolling movement of cams 4, 5 on the corresponding guide strips 6, 7 very thin steel strips 18 are interposed between these parts. Their upper ends are secured for example by means of screws on the guide strips 6, 7, and their lower ends are secured on the cradle 3 by screw-and-nut devices 20 permitting their longitudinal adjustment.

In order to ensure a proper rolling engagement and to keep these steel strips constantly under mechanical tension, balancing and pressure members such as oblique springs or rods 22 pivoted on links and supporting adequate weights 24 may be provided. With these different elements it is nevertheless possible to displace the cradle 3 freely, according to the position of brackets 10 and 11.

For its practical use the machine is completed by a protective casing 26 to avoid the projection of cooling liquid fed through the pipe 27.

A spindle 28 driven from a separate motor 31 at a relatively high speed is adjustably mounted in an inclined position on a graduated sector 30 carried by the frame structure 13 of the machine.

If the balancing members are properly designed, the cutting movement may take place in both directions, that is, when the cradle 3 is displaced clockwise as well as counter-clockwise.

This is an advantageous feature in that it permits of constructing an automatic machine in which the motion is reversed and stopped automatically upon completion of the cycle by the actuation of reversing and limit switches 32 carried for example by the cam 9 and actuated by their engagement by the roller 8. Thus, it is possible to change the glass when the latter is adjacent to the outer edge of the grinding wheel 29, and to start the machine, the cycle comprising a cutting or machining stroke in one direction and a finishing stroke in the reverse direction.

In order to keep due account of possible differences in the thickness of the glass to be machined, the mounting 2 is completed by a device 25 for moving the glass 1 in either direction along the axis of mounting 2.

With a view to preserve the stability of the cradle 3, the cams 4, 5 and guide strips 6, 7 as explained hereinabove are disposed on either side of the glass so that the position of this cradle is determined by three contact points, i.e. 8, 9 on the left, 4, 6 at the front, and 5, 7 at the rear of the machine, to form an isosceles triangle (Fig. 16).

Figure 18:
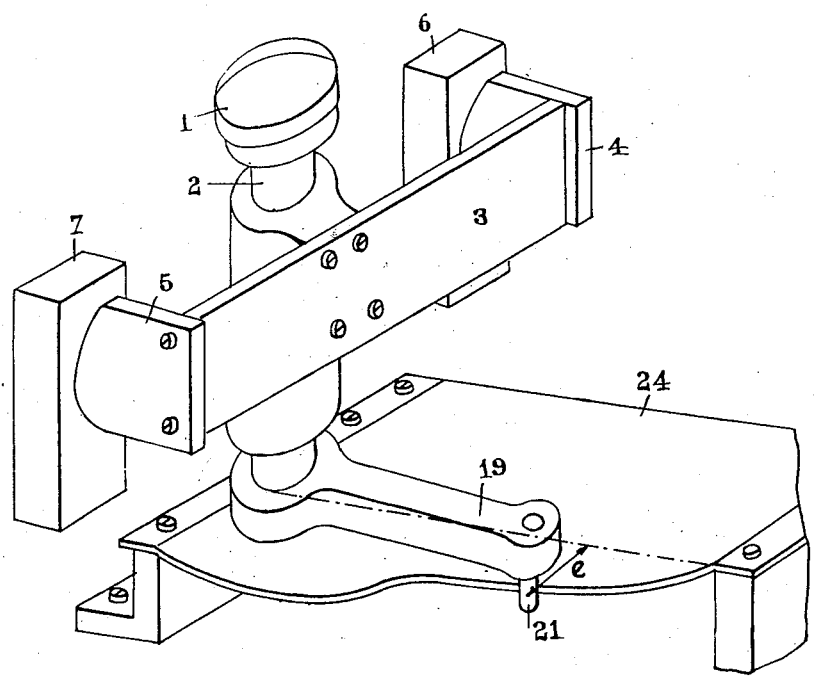
Figure 18 is a perspective view showing a complementary arrangement of the machine illustrated in Figs. 15 to 17 for cutting a surface having a skew directrix curve or main line.

It is frequently useful to apply the mode of generation according to this invention to the general case of the formation of a surface having a progressive focal power, of which the directrix curve or main line along which the two main radii of curvatures equal is a skew curve instead of a plane curve. In this case it is sufficient to use an asymmetric generating surface having a skew main line G instead of a plane main line. This result may also be obtained with the method of generating a surface symmetrical with respect to a plane, as defined hereinabove, by causing the mounting carrying the body to be cut to revolve about its axis as the generating movement takes place. To this end, the machine illustrated in Figs. 15 to 17 may be completed in the manner shown in Fig. 18. In this arrangement the mounting 2 of the glass 1 to be cut, instead of being rigidly mounted on the cradle 3 carrying the cams 4, 5 in rolling engagement with the guide strips 6, 7, is rotatably mounted in this cradle 3. The rotation of this mounting 2 is controlled by a radial arm 19 having a pin 21 secured on and depending from its free end, this pin 21 constantly engaging a fixed cam contour 24. During the rolling movement of cams 4, 5 on guide strips 6, 7 respectively, the pin 21 runs along the cam contour 24 and the discrepancy $e$ of this contour in relation to the plane of symmetry imparts to the glass mounting 2 the desired rotation in the cradle 3. The permanent contact engagement of this pin 21 on the cam countour 24 may be obtained for example by providing a return spring (not shown) urging the cradle 3 in a direction to press the arm 19 against the cam contour 24.

Lenses or glasses made from a skew directrix curve or main line may be extremely advantageous in the manufacture of binocular lenses as will be explained hereafter with reference to Figs. 10 to 14, the data for determining the optimum shape of this skew curve being also indicated.

Figure 10:
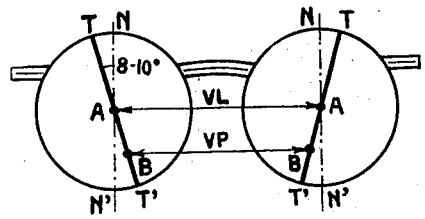
Figures 10 to 14 illustrate on the one hand the use of progressive surfaces having skew main lines or directrix curves which are generated according to this invention in the cutting of binocular lenses, and on the other hand the optimum determination of these skew main lines or directrix curves.

Thus, Fig. 10 shows that to obtain a near-sight pupillary divergence having a difference of minus 2 millimeters relative to the far-sight pupillary divergence, the plane of symmetry of the two lenses must be inclined by about 8° to 10° in relation to the vertical plane NN'.

This is the arrangement usually resorted to in two-foci lenses having a plane of symmetry.

Figure 11:
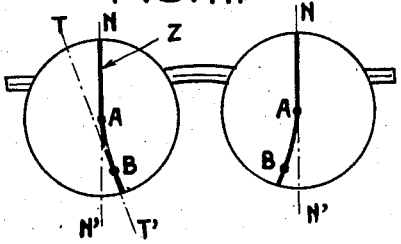

Figure 11 shows on the contrary a glass obtained in accordance with the new embodiment wherein the curve Z is the locus of the points having their two main orthogonal radii of curvature exactly equal to each other. Thus, for example, A will give the far-sight and B the near-sight.

The tangent at A, N, N' may thus be vertical.

Figure 12:
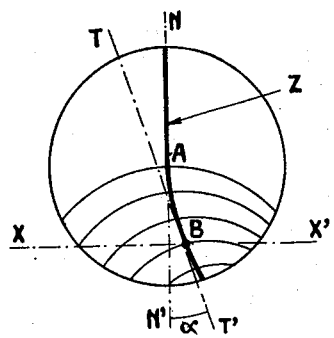

Figure 12 illustrates a lens formed in this manner and it will be seen that at B the tangent TT' to the curve Z forms an angle $\alpha$ with N, N' which will be selected as a function of the law of convergence-accommodation which has been selected beforehand.

Figure 13:
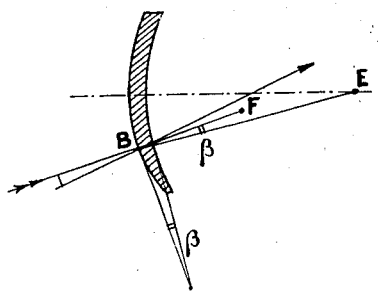
Figure 14:
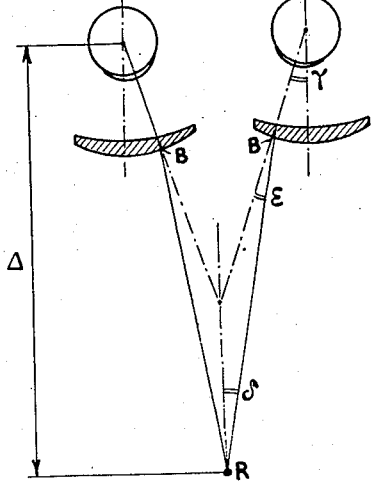

To determine this law it will be well to resort to the vertical prismatic effects shown in Fig. 13 and to the horizontal prismatic effects shown in Fig. 14, it being necessary to take these effects into account in the accommodation-convergence linking in order to comply with the physiological equilibrium of the muscles of the eyes and give the maximum comfort to the wearer.

As a matter of fact, Figure 13 shows that the deviation of a light ray passing through B is subordinate to the equivalent prism at B; the value of this prism being given by the angle of the normals BE and BF: E being the normal of the concave diopter, and F the normal of the convex diopter.

Again, in Fig. 14 the transverse deviation will be found through the examination of the optical characteristics of the glass. If $\epsilon$ is the deviation produced by the glass at B, the true convergence of the eye will be found which is equal to $\gamma$ whilst its practical convergence will be $$\delta(\delta = \gamma \pm \epsilon)$$

One point B of (Z), will be satisfactory if: (1) the increase in power ($\varphi$) in relation to the far sight combined with the accommodation (A) of the observer permits the vision of the object R placed at a distance ($\Delta$), that is to say: $A + \varphi = 1/\Delta$; (2) the normal convergence of the eyes (angle $\gamma$ corresponding to the accommodation (A) combined with the prismatic effect $\epsilon$ of the lenses at B will actually lead to the object R to be looked (angle $\delta$).

When $\varphi$ and A are known, $\Delta$ is calculated. It is then a simple matter to place B on XX' so that the relationship $\delta = \gamma \pm \epsilon$ be confirmed. Thus, the curve (Z) may be traced point by point.

Without departing from the spirit and scope of this invention it is also possible to select a different curve Z so that each point thereof, instead of corresponding to the usual equilibrium between the accommodation and convergence, will on the contrary correct a physiological lack of equilibrium.

Thus, with this method it will be possible to correct certain forms of heterophoria by relieving the convergence with respect to accommodation, and vice-versa.

What I claim is:

1. A machine for cutting in a piece of refractive material an optical surface having a plane of symmetry intersecting this surface along a directrix curve along which said optical surface has transverse curvatures of which the values vary progressively between two limit values in the planes normal to said directrix curve, said machine comprising a frame structure, a grinding wheel mounted on said frame structure for rotation about an axis and formed with an abrasive surface of revolution about said axis, said abrasive surface being cut by the vertical plane coincident with the axis of the wheel according to a meridian along which said abrasive surface has in planes normal to said meridian transverse curvatures varying progressively between the same limits as the transverse curvatures of the optical surface to be cut along its longitudinal line, power means rotatably driving said grinding wheel at a relatively high speed about its axis, two cams carried by said frame structure symmetrically on either side of the vertical plane of the axis of rotation of said wheel, said two cams having identical contours, a cradle, another pair of identical cams carried by said cradle, said other cams being of cylindrical configuration with their generatrices extending at right angles to the vertical plane of the axis of rotation of the wheel, and adapted to engage said pair of cradle-carried cams respectively, means for maintaining said cradle-carried cams in slip-free rolling engagement with said frame-carried cams, a mounting carried by said cradle for securing the piece of refractive material, and power means for imparting a relatively slow motion to said cradle.

2. A machine for cutting in a piece of refractive material an optical surface having a plane of symmetry intersecting this surface along a directrix curve along which said optical surface has transverse curvatures of which the values vary progressively between two limit values in the planes normal to said directrix curve, said machine comprising a frame structure, a grinding wheel mounted on said frame structure for rotation about an axis, said grinding wheel having an inner abrasive surface having the shape of a cone of revolution, said abrasive surface being intersected by the vertical plane coincident with the axis of the grinding wheel along a substantially horizontal generatrix, power means driving said grinding wheel at a relatively high speed about its axis, a cam carried by said frame structure and formed with an operative contour substantially coincident with the vertical plane of the axis of rotation of said grinding wheel, a carriage mounted for longitudinal sliding movement on said frame structure, a pair of parallel brackets supported by said carriage on either side of, and symmetrically to, the vertical plane of the axis of rotation of said grinding wheel, said brackets having plan carrier faces extending in substantially vertical planes exactly at right angles to said generatrix of said abrasive surface, a cradle, a roller carried by said cradle and in rolling engagement with said cam carried by the frame structure, a pair of identical cams carried by said cradle and engaging the aforesaid plan carrier faces of said brackets respectively, a mounting carried by said cradle for securing thereon said piece of refractive material, and power means adapted to impart a relatively slow sliding motion to said carriage on said frame structure.

3. A machine as set forth in claim 2 for cutting an optical surface in which at each point of the directrix curve the curvature of said directrix curve is equal to the transverse curvature of the surface, wherein the cams carried by said cradle are shaped according to the evolute of said longitudinal line, whereas the cam carried by said frame structure is shaped with a view to maintain the horizontal line coincident with the points of contact of the cradle-carried cams and of the plan carrier faces of said brackets in a plane having its line of highest slope coincident with the axis of rotation of said grinding wheel.

4. A machine as set forth in claim 2, wherein means for balancing the carriage and cradle assembly are provided which comprise two arms having each one end pivoted on one of said brackets, two links connecting said arms to said cradle, and two weights suspended from the other ends of said arms respectively.

5. A machine for cutting in a piece of refractive material an optical surface having a directrix curve along which said optical surface is characterized, in planes extending normally to said directrix curve, by transverse curvatures varying progressively between two limit values, said machine comprising a frame structure, a grinding wheel mounted on said frame structure for rotation about an axis, said grinding wheel having an internal abrasive surface having the shape of a cone of revolution, said abrasive surface being intersected by the vertical plane coincident with the wheel axis along a substantially horizontal generatrix, power means rotatably driving said wheel at a relatively high speed about its axis, a cam carried by said frame structure and formed with an operative contour disposed substantially in a horizontal, a carriage mounted for longitudinal sliding motion on said frame, two brackets carried by said carriage on either side of, and symmetrically to the vertical plane of the axis of rotation of said grinding wheel, said two brackets having plan carrier faces extending in substantially vertical planes exactly at right angles to the aforesaid generatrix of said abrasive surface, a cradle, a roller carried by said cradle and in rolling engagement with the vertical cam carried by said frame structure, two identical cams carried by said cradle and engaging said plan carrier faces of said two brackets respectively, a shaft having two ends which is mounted in said cradle for rotation about an axis coincident with the vertical plane of the axis of rotation of said grinding wheel, a mounting for securing said piece of refractive material carried by one end of said shaft, a radial arm carried by the other end of said shaft, a pin carried by said radial arm and extending in a direction parallel to said shaft, resilient means urging said shaft for rotation in relation to said cradle until said pin engages the operative contour of said other substantially horizontal cam carried by said frame structure, and power means for imparting a slow sliding motion to said brackets on said frame structure.

References Cited in the file of this patent
UNITED STATES PATENTS

| | | |
|---|---|---|
| 2,291,000 | Simpson | July 28, 1942 |
| 2,755,602 | Evans | July 24, 1956 |